US006571300B2

(12) United States Patent
Pitot et al.

(10) Patent No.: US 6,571,300 B2
(45) Date of Patent: *May 27, 2003

(54) OFFSET AUTONOMOUS INPUT/OUTPUT CONTROLLER WITH TIME SLOTS ALLOCATION

(75) Inventors: Christian Pitot, Boulogne Billancourt (FR); Olivier Le Borgne, Montigny le Bretonneux (FR)

(73) Assignee: Sextant Avionique, Velizy Villacoublay (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,171

(22) PCT Filed: Dec. 16, 1997

(86) PCT No.: PCT/FR97/02316

§ 371 (c)(1),
(2), (4) Date: Jun. 21, 1999

(87) PCT Pub. No.: WO98/28694

PCT Pub. Date: Jul. 2, 1998

(65) Prior Publication Data

US 2002/0199127 A1 Dec. 26, 2002

(30) Foreign Application Priority Data

Dec. 20, 1996 (FR) .............................. 96 15745

(51) Int. Cl.[7] .................................................. G06F 3/00
(52) U.S. Cl. ................................ 710/6; 710/5; 710/58; 713/500
(58) Field of Search ........................... 710/14, 62, 264, 710/5, 6, 58; 713/500

(56) References Cited

U.S. PATENT DOCUMENTS 4,145,735 A * 3/1979 Soga ........................... 710/264
4,510,580 A * 4/1985 Yomogida et al. ........... 712/245
4,771,403 A * 9/1988 Maskovyak et al. .......... 710/14
5,070,476 A * 12/1991 Fujiwara ....................... 714/25
5,095,426 A * 3/1992 Senta .......................... 712/244
5,185,880 A * 2/1993 Ueda et al. .................. 713/500
5,257,359 A * 10/1993 Blasco et al. ................ 711/138
5,270,627 A * 12/1993 Rehse ......................... 318/575
5,283,749 A * 2/1994 Tanahashi ............... 364/474.01
5,359,507 A * 10/1994 Egami ......................... 364/140
5,375,208 A   12/1994 Pitot
5,636,362 A * 6/1997 Stone et al. .................. 711/129
5,666,292 A * 9/1997 Hunter et al. ................. 710/62
5,701,315 A   12/1997 Pitot et al.
5,719,577 A   2/1998 Pitot et al.

FOREIGN PATENT DOCUMENTS

EP       0 694 842        1/1996
JP     356022145 A   *   3/1981

OTHER PUBLICATIONS

"Autonomous Input/Output Controller –Part 1", Elektor Electronics, vol. 14, No. 162, Dec. 1988, London, GB, pp. 30–36.

"Autonomous I/O Controller –Final Part", Elektor Electronics, vol. 15, No. 163, Jan. 1989, London, GB, pp. 40–44.

* cited by examiner

Primary Examiner—Thomas Lee
Assistant Examiner—Chun Cao
(74) Attorney, Agent, or Firm—Oblon, Spivak, McClelland, Maier & Neustadt, P.C.

(57) ABSTRACT

An input/output controller interacts with a central processing unit of a computer which communicates with peripheral electronic equipment. The link with the central processor unit is produced with an input serial line and at least one output serial line. It receives instructions of a first type from the central processing unit and instructions of at least a second kind which are stored in the memory external to the central processing unit. These are processed using a sequencer device which allocates time slots to the instructions according to their type. This device is especially useful in the field of avionics and flight management systems.

30 Claims, 3 Drawing Sheets

OFFSET AUTONOMOUS INPUT/OUTPUT CONTROLLER WITH TIME SLOTS ALLOCATION

BACKGROUND OF THE INVENTION

1. Field of the Invention

The present invention concerns an input/output controller intended to interact with a central processor unit of a computer which communicates with various peripheral electronic equipment. This input/output controller may be used in particular in the field of avionics.

2. Discussion of the Background

Currently, there are a plurality of computers present at the same time in aircraft, each driving a single application. The term application is intended for example to mean the automatic pilot, the ground proximity detection system, the system for protection against stalling, etc.

In each computer, the central processor unit is connected by a parallel bus to the peripheral electronic equipment belonging to the application in question. This link by a parallel bus makes it possible to transmit information at a high rate, but requires a large number of connection pins.

Such a link involves a certain degree of insecurity because, if a fault occurs, all the data carried on this link are lost. Since each application is processed independently of the others, this insecurity is tolerable.

With the significant progress in the speed and capacity of the processors, and with a view to reducing costs, it is conceivable for only a single central processor unit to drive a plurality of applications. In order not to compromise the security involved with processing a plurality of applications in the same central processor unit, the invention relates to an input/output controller which interfaces between the central processor unit of a computer and the various peripheral electronic equipment belonging to these applications.

SUMMARY OF THE INVENTION

The present invention provides an input/output controller intended to interact with a central processor unit of a computer which communicates with peripheral electronic equipment, and connected on the one hand to the central processor unit and on the other hand to the peripheral electronic equipment, characterized in that the link with the central processor unit is produced with an input serial line and at least one output serial line, and in that it receives instructions of a first type from the central processor unit via the input serial line and instructions of at least one second type which are stored in a memory external to the central processor unit which it processes using a sequencer device which allocates time slots to the instructions according to their type.

This input/output controller is self-contained and can operate with all types of central processor unit and peripheral electronic equipment.

One or more types of instructions from the memory may be described as pseudo-instructions formed by lists of analogue values which are stored in the memory, the various types corresponding to lists of values of different natures.

Certain instructions other than pseudo-instructions from the memory may form sequences which are executed after reception of a synchronization instruction.

The sequencer device may allocate equal time slots for the successive processing of each of the types of instructions, then allows itself an optionally zero time interval without processing before recommencing the processing. Each type of instructions is processed with the same frequency.

More sophisticated sequencing may be envisaged so as to allow processing with frequencies matched to the various types of instructions. Such sequencing gives a much better solution to the needs encountered in an avionics application.

The sequencer device may allocate equal time slots to the processing of the instructions according to their type, each type of instructions being assigned an occurrence period, the first type of instructions which is processed having the shortest period, this period being referred to as the reference period, and a phase referred to as the reference phase, the other types of instructions having a phase constraint in relation to the reference phase, these other types of instructions being processed with a rank which is a function of the increasing order of their phase constraint, their period being a multiple of the reference period.

It is simpler to choose by convention a zero reference phase.

The reference period may be a multiple of a duration, referred to as the base period, which corresponds to the access time for an instruction in the memory.

It is advantageous to express the phase constraint of the second type of instructions which is processed by a phase increment in relation to the reference phase. The phase constraint of the types of instructions of rank higher than 2 is expressed by a phase increment in relation to the phase constraint of the type of instructions which is processed in the preceding rank.

A sequencer device for processing the various types of instructions with different frequencies may have:
  a device delivering a phase referred to as the current phase from a base clock whose period corresponds to the access time for an instruction in the memory,
  a first divider of the base clock which receives, in addition to the base clock, the value of the reference period and which generates pulses having the reference period and the reference phase;
  one predivider and divider assembly associated respectively with each of the other types of instructions to be processed, and receiving the base clock and the reference period,
  each predivider receiving the value of the reference period and a start signal originating from the comparison between the phase constraint of the associated type of instructions and the current phase, and generating, in the direction of the divider of the same assembly as itself, a signal which has a period equal to the reference period and is phased according to the phase constraint of the associated type of instructions,
  each divider generating pulses having the period and the phase constraint of the associated type of instructions.

The device delivering the current phase may be produced by a saturation counter receiving the base clock.

The saturation counter may be zeroed when the input/output controller is reengaged or by a signal delivered by a reset device.

Each predivider may be associated with a comparator which delivers the start signal to it, each comparator receiving the current phase and the phase constraint, in relation to the reference phase, of the associated type of instructions.

The first comparator directly receives the value of the phase increment of the second type of instructions in relation to the reference phase, whereas the other comparators are each associated with an adder, each adder delivering the phase constraint, in relation to the reference phase, of the associated type of instructions, and receiving the phase constraint of the type of instructions which is processed with the preceding rank and the value of the phase increment in relation to the said constraint.

An instruction other than a pseudo-instruction may be of the ARINC 429 type and have thirty-two bits, including a code on at most eight bits and a parameter on at most twenty-one bits.

The values of the occurrence periods and of the phase constraints of the various types of instructions may be coded in the parameter of one or more loading instructions.

The input/output controller according to the invention may have a code analysis device which decodes the codes of the instructions.

A pseudo-instruction is executed under the control of an activation instruction. It has, on thirty-two bits, a list of analogue values which are coded either in the form of increments or in the form of absolute values.

The input/output controller may, for managing the pseudo-instructions, have drive means for the pseudo-instructions which receive the activation instructions, which keep the codes of the activation instructions and deal with access to the memory via an access pointer. The code analysis device receives the pseudo-instructions and the codes of the activation instructions from the drive means for the pseudo-instructions.

If a plurality of accesses to the memory are necessary in order to extract an instruction, it is desirable for the input/output controller to have management means for the memory with a buffer unit driven by the sequencer device. The buffer unit may also be driven by the drive means for the pseudo-instructions.

The management means for the memory may also have a sequencer device for downloading to the memory on the basis of instructions received from the central processor unit.

It is advantageous for the input/output controller to be able to communicate in acquisition mode or in generation mode with the peripheral electronic equipment by a plurality of two-way interface channels which can be configured in particular as a parallel bus, as a link carrying Boolean operations, as a serial link and as a link with an optical coder, and to that end the input/output controller may have at least one interface device connected to the peripheral electronic equipment by at least one of the these interface channels. This interface device is entirely standard.

In the same way, an interface device may be provided for interfacing with the central processor unit, connected to the central processor unit by the input and output lines.

BRIEF DESCRIPTION OF THE DRAWINGS

The invention will be understood more clearly, and other characteristics and advantages will become apparent on reading the description of the embodiments which is illustrate by the appended figures, in which.

DETAILED DESCRIPTION OF THE PREFERRED EMBODIMENTS

Figure 1:
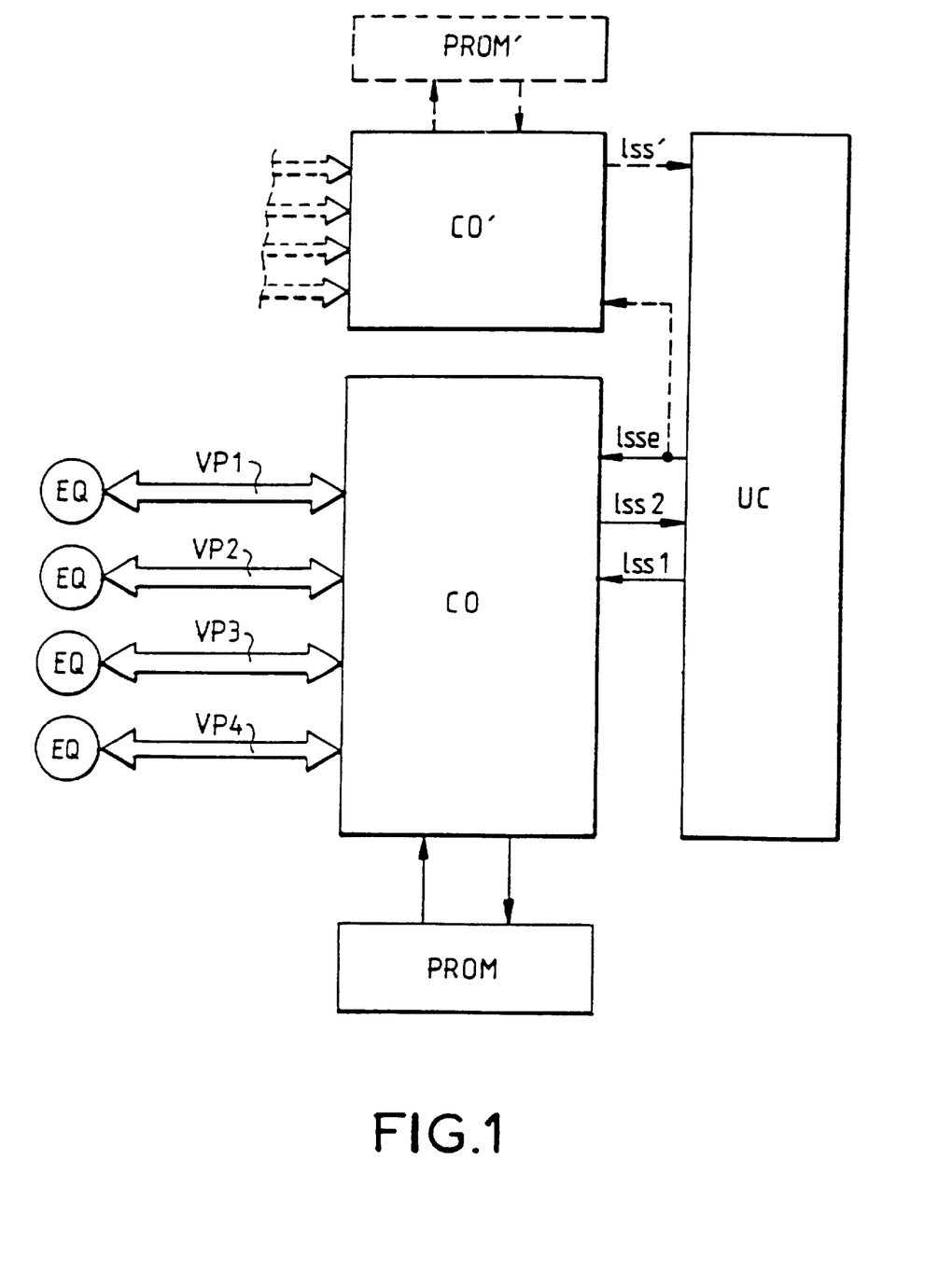
FIG. 1 represents at least one input/output controller according to the invention in its context.

FIG. 1 very schematically shows a first input/output controller CO according to the invention, in its environment. In this example, it is intended to operate in an avionics application.

This input/output controller CO is intended to interact with a central processor unit UC of a computer (not shown) which communicates with peripheral electronic equipment EQ. In the avionics application, this peripheral electronic equipment EQ consists of sensors or actuators. The input/output controller CO receives instructions of a first type from the central processor unit UC via an input serial line Isse and transmits information to the central processor unit UC via at least one output serial line Iss. In the example described, two output serial lines Iss1, Iss2 are preferably used. It is possible to provide for one of the output serial lines Iss1 to transmit information, via the input/output controller CO, only from the peripheral electronic equipment EQ, and for the other Iss2 to be able to transmit information, via the input/output controller CO, from peripheral electronic equipment EQ and also from other devices as will be seen below. Optionally, a plurality of input/output controllers according to the invention may be connected to the same central processor unit UC by the same input serial line Ise. In FIG. 1, a second input/output controller CO' has been represented in dashes. This second input/output controller CO' is connected to the central processor unit UC by at least one output line Iss'.

Each input/output controller CO, CO' is intended to interact with an external memory, respectively referenced PROM, PROM', of the central processor unit UC. They receive instructions of one or more types from the associated memory PROM, PROM'.

The rest of the description is given with reference to the input/output controller CO, and the others would be similar. The input/output controller CO is intended to communicate in information acquisition or generation mode with the peripheral electronic equipment EQ. A plurality of two-way links or interface channels VP1, VP2, VP3, VP4 are provided between the input/output controller CO and the peripheral electronic equipment EQ. These interface channels VP1, VP2, VP3, VP4 are capable of being configured by the instructions received by the input/output controller CO, in particular as parallel buses, as links carrying Boolean operations, as serial links and even as links with an optical coder, and can operate in input or output mode. In the example represented in FIG. 1, it is assumed that, at a given time, the first channel VP1 is configured as a parallel bus in input mode, the second channel VP2 is configured as a link carrying Boolean operations in output mode, the third channel VP3 is configured as a serial link in output mode and that the fourth channel VP4 is configured as a link with an optical coder in input mode.

Figure 2:
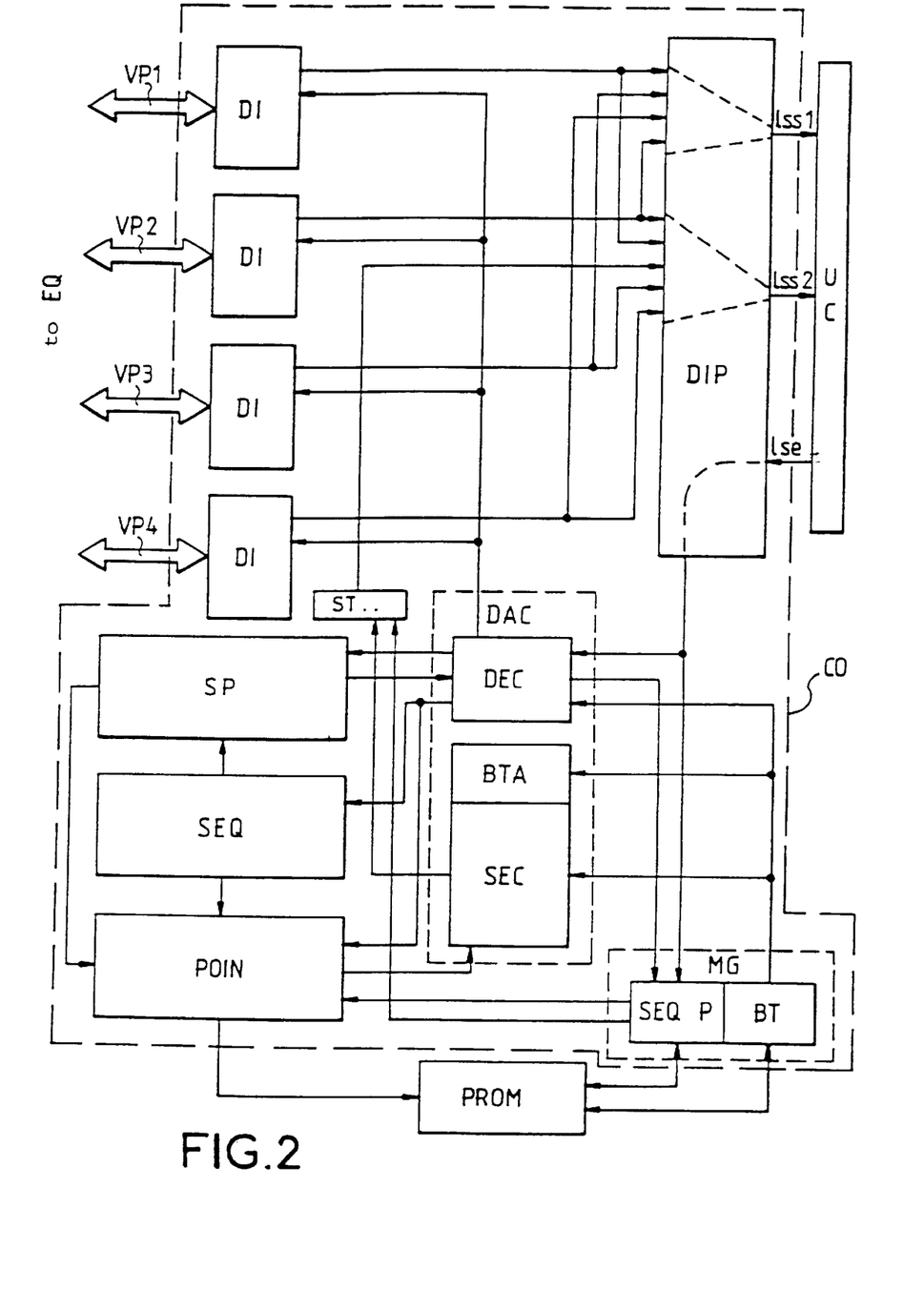
FIG. 2 represents the structure of an input/output controller according to the invention.

FIG. 2 shows in detail the various functions of an input/output controller according to the invention.

The input/output controller CO has at least one interface device DI for interfacing with the peripheral electronic equipment EQ. This interface device DI is connected to the peripheral electronic equipment EQ by at least one interface channel VP1, VP2, VP3, VP4. In the avionics application of the example described, four identical standardized serial/parallel interface devices DI are sufficient to communicate with all the peripheral electronic equipment EQ present. Further details about the interface devices DI will be given below.

The input/output controller CO has an interface device DIP connected to the central processor unit UC by the input Ise and output Iss1, Iss2 lines.

The input/output controller CO is intended to receive instructions, on the one hand, from the central processor unit UC and, on the other hand, from the memory PROM and to process them, that is to say decode them in a code analysis device DAC, and route them to suitable components, that is to say the peripheral electronic equipment EQ or the central processor unit UC. The input/output controller CO processes the instructions alternately according to their type, and to that end has a sequencer device SEQ. The way in which it operates will be described below.

One or more types of instructions from the memory PROM may be described as pseudo-instructions. A pseudo-instruction consists of a list of analogue values which are stored in the memory PROM. These pseudo-instructions are implemented under the control of an activation instruction and until a deactivation instruction.

In the avionics application, these lists of analogue values may correspond to a waveform to be transmitted in order to activate a sensor, or to an audio signal, for example an alarm to be sounded in order to warn the crew. The various types correspond to lists of values of different natures. In the example described, it is assumed that two different types of instructions in the form of lists of analogue values may come from the memory PROM. In the rest of the description, when the term instruction is used without particular indication, this term also covers the pseudo-instructions.

Certain instructions other than the pseudo-instructions, from the memory PROM, may be executed in sequence after a synchronization instruction.

An instruction other than a pseudo-instruction is modelled as an ARINC 429 word with 32 bits. It has a code on 8 bits (bits 0 to 7) at most which indicates the action to be executed, bits 8 and 9 being used for security. An action of acquiring data from the peripheral electronic equipment EQ to the central processor unit UC is coded on five bits (bits 0 to 4). These bits indicate the nature of the acquisition. Bit 5 tells which output serial line Iss1 or Iss2 is to be taken to the central processor unit UC and bits 6 and 7 tell about the relevant interface device DI and interface channel.

In the same way, an action for generating data in the direction of a peripheral electronic equipment item EQ is coded on 6 bits (bits 0 to 5). These bits indicate the nature of the data generation. Bits 6 and 7 tell about the relevant interface device DI and interface channel.

Bits 8 and 9 of an instruction from the central processor unit UC identify the target input/output controller CO, CO' since there may be many of them.

When the instruction consists in transmitting a data item to the central processor unit UC, the code has a label which must precede the data item to be transmitted. When the instruction consists in transmitting a data item from a peripheral electronic equipment item EQ to the central processor unit UC, bits 8 and 9 identify the transmitter.

An instruction also has a parameter on 21 bits (bits 10 to 30) at most, and this parameter may represent a base address in the memory PROM, for example for instructions for downloading to the memory PROM, synchronization or activation instructions, a programming data item, for example for programming the sequencing, a value to be sent to the peripheral electronic equipment EQ or to the central processor unit UC, or a default duration when no other parameter is required. When the parameter has fewer than 21 bits, the coded data are on the least significant bits (bits 10 onwards). Bit 31 is a parity bit and the parity of an instruction is odd.

Certain instructions may use 16 bits of the parameter for coding the data and the following five bits as a check. These instructions are preferably used for driving the interface devices DI to which the peripheral electronic equipment EQ is connected.

The instructions from the memory PROM cannot use certain codes, such as those which correspond to erasing, to downloading and to rereading the memory PROM. These codes are for the exclusive use of the central processor unit UC.

An activation instruction will have as code the action to be carried out, which may correspond to the target of the analogue values and, as parameter, the initial routing address of the sequence of analogue values to be extracted from the memory PROM.

The input/output controller CO also has drive means SP for the pseudo-instructions. These drive means SP receive the activation and deactivation instructions from the code analysis device DAC. They keep the code of the activation instructions and deal with accessing the memory PROM via an access pointer POIN and transmitting the pseudo-instruction and the code to the code analysis device DAC.

The access pointer POIN is furthermore used to access the memory PROM after a synchronization instruction which has as parameter the initial routing address of the first instruction of the sequence to be executed or to generate standardized values which are used in the erasing and programming sequences for the memory PROM.

Put end to end, the bits 8 of the instructions in sequence from the memory PROM can code the current address of the PROM access pointer according to the French patent published under No. 2 723 222 in the name of the Applicant Company. Bit 9 identifies the entry point of a sequence stored in the memory PROM.

The pseudo-instructions read from the memory PROM can assume different formats on 32 bits depending on the dynamic range and the amplitude of the analogue values to be sent. The analogue values may be coded in increment form or in absolute value form.

For example, a pseudo-instruction may contain 3 values of 9 bits or alternatively 4 values of 7 bits, or even 2 values of 14 bits.

The last bit is a parity bit and the parity of a pseudo-instruction is odd. The penultimate bit is a security bit. Put end to end, the security bits of a list of successive pseudo-instructions can code the inverse of the current address of the pointer for accessing the memory PROM according to the French patent published under the No. 2 723 222 in the name of the Applicant Company.

The choice of using inverse coding for the sequences of instructions and the sequences of analogue values makes it possible to guarantee that it is impossible for the program to accidentally execute a sequence of analogue values instead of a sequence of instructions, and vice versa.

It is then possible to detect and prevent the execution of a sequence that does not correspond to the execution context by the use of coding of different invariants according to the context.

The other free bits of the pseudo-instructions indicate whether the values are coded in increment or absolute value form and whether or not an end of sequence is present.

This coding in increment or absolute value form makes it possible to optimize the space occupied in the memory PROM, in particular for sounds. The periods of small dynamic range can advantageously be coded in either 7 bit or 9 bit increment form, while the periods with low amplitudes can be coded in 9 bit absolute value or 7 bit increment form. For their part, the 14 bit values represent absolute values.

It has been seen that the code analysis device DAC receives instructions of a first type from the central processor unit UC and instructions of one or more types from the memory PROM. It processes them alternately at a rate allocated by the sequencer device SEQ. The rate may be fixed or programmable.

More generally, if the input/output controller CO has to process n types of instructions, the sequencer device SEQ may divide the processing time into n+1 slots (n is an integer greater than or equal to two), n of these equal slots being given over to the successive processing of each of the n types of instructions, the last slot of optionally zero programmable duration makes it possible to adjust the recurrence of the sequencing. At the end of the last slot, the processing recommences.

It is assumed in the example described that the input/output controller CO receives three types of instructions from the memory PROM, of which two types correspond to pseudo-instructions, and one type of instructions from the central processor unit UC. These four types of instructions are respectively referenced CO1 for the pseudo-instructions corresponding to the actuation, CO2 for the instructions from the memory PROM, CO3 for the pseudo-instructions corresponding to the audio signals, and CO4 for the instructions from the central processor unit UC.

The instructions CO1 can be processed during the first slot of the processing time, the instructions CO2 can be processed during the second slot, the instructions CO3 can be processed during the third slot, the instructions CO4 can be processed during the fourth slot and no processing is carried out during the fifth slot.

The minimum access time for the memory PROM, or atomic time, is between 2 and 8 periods of the general clock of the computer. For a 20 MHz clock, the atomic time can be programmed in 50 ns steps from 100 ns to 400 ns.

A plurality of successive accesses to the memory PROM are necessary for reading an instruction, and in the case of an 8 bit memory and a 32 bit instruction, which is the case in the example described, four accesses are required. The length of time necessary for accessing an instruction is then equal to four times the atomic time. This length of time is referred to as the base period and its inverse as the base frequency.

It can therefore be seen that, assuming a 200 ns atomic time and a duration for the fifth slot equal to 400 ns, the maximum processing frequency for the instructions or pseudo-instructions of one of the contexts has the value 277.8 kHz. The recurrence of the sequencing has the value 3.6 $\mu$s. It is then possible to generate actuation at 5 kHz with 55.5 samples per period or actuation at 2.78 kHz with 100 samples per period.

Assuming a 200 ns atomic time and a zero duration for the fifth slot, the maximum processing frequency for one type of instructions has the value 312.5 kHz. The recurrence of the sequencing has the value 3.2 $\mu$s. It is possible to generate actuation at 5 kHz with 62.5 samples per period or actuation at 3.125 kHz with 100 samples per period.

This sequencing allocates equal time slots to the various types of instructions, and the various types of instructions are processed with the same frequency.

More sophisticated sequencing may make it possible to increase the processing frequency for one type of instructions compared with that of the other types and to adapt the processing frequency according to the type of instructions. In the avionics application, the pseudo-instructions which send the actuations have the highest frequency.

The sequencer device SEQ may divide the processing time into a succession of equal time slots, these slots being given over to the processing of the instructions according to their type. It is assumed that the various types of instructions are the same as those described in the previous example.

For each type of instructions, an occurrence period is defined. The first type of instructions CO1 which is processed is the one having the shortest occurrence period. This period is referred to as the reference period and is defined by a multiple of the base period. The first type of instructions CO1 which is processed is assigned a phase, referred to as the reference phase, which by convention is preferably chosen to be zero. In order to guarantee that, at any given time, only a single type of instructions is processed, the other types of instructions CO2, CO3, CO4 have a phase constraint in relation to the reference phase and these other types of instructions CO2, CO3, CO4 are assigned a processing rank (from 2 to n) which is a function of the increasing order of their phase constraint.

The period of the second type of instructions CO2 which is processed is a multiple of the reference period. Its phase constraint is expressed by the phase increment in relation to the reference phase, this increment being counted in terms of the base period.

The period of the third type of instructions CO3 which is processed is a multiple of the reference period. Its phase constraint is expressed by the phase increment in relation to the phase constraint of the second type of instructions CO2 which is processed, this increment being counted in terms of the base period.

More generally, the type of instructions which is processed with rank i (integer greater than two) has as its period a multiple of the reference period and its phase constraint is expressed by the phase increment in relation to the phase constraint of the type of instructions which is processed with rank i–1, this increment being counted in terms of the base period. In the example described, i is an integer between 3 and 4.

The values of the periods, reference phase (if it was not zero) and of the phase constraints can be coded on a plurality of bits, for example three. This rate can be programmed in the form of one or more loading instructions. The value of the reference phase could also be coded if it is not zero.

In the example with four types of instructions CO1, CO2, CO3, CO4, a single loading instruction whose parameter has 21 bits is sufficient if it is assumed that the reference phase is zero.

The first three bits aaa of the parameter code the reference period.

Here are the meanings of the codes used:
001: processing with the base period. In this case either only this first type of instructions is processed, or if another type of instructions is processed, this first type of instructions is inactive and the reference period useful only for defining the period of the other type of instructions which is processed.
010: processing with the base period multiplied by 2
011: processing with the base period multiplied by 3
100: processing with the base period multiplied by 4
101: processing with the base period multiplied by 5
110: processing with the base period multiplied by 6
111: processing with the base period multiplied by 7
000: processing with the base period multiplied by 8
Since the reference phase is zero, it is not coded.

The next three bits bbb of the parameter code the phase constraint of the second type of instructions CO2.

Here are the meanings of the codes used:

000: unused type of instructions,

001: phase increment by one base period in relation to the reference phase,

010: phase increment by two base periods in relation to the reference phase,

011: phase increment by three base periods in relation to the reference phase,

100: phase increment by four base periods in relation to the reference phase,

101: phase increment by five base periods in relation to the reference phase,

110: phase increment by six base periods in relation to the reference phase,

111: phase increment by seven base periods in relation to the reference phase,

The next three bits ccc code the period of the second type of instructions CO2.

Here are the meanings of the codes used:

001: processing with the reference period,

010: processing with a period which is twice the reference period,

011: processing with a period which is three times the reference period,

100: processing with a period which is four times the reference period,

101: processing with a period which is five times the reference period,

110: processing with a period which is six times the reference period,

111: processing with a period which is seven times the reference period,

000: processing with a period which is eight times the reference period.

The next three bits ddd code the phase constraint to the third type of instructions CO3.

Here are the meanings of the codes used:

000: unused type of instructions

001: phase increment by one base period in relation to the phase constraint of the second type of instructions, 010: phase increment by two base periods in relation to the phase constraint of the second type of instructions, 011: phase increment by three base periods in relation to the phase constraint of the second type of instructions, 100: phase increment by four base periods in relation to the phase constraint of the second type of instructions, 101: phase increment by five base periods in relation to the phase constraint of the second type of instructions, 110: phase increment by six base periods in relation to the phase constraint of the second type of instructions.

111: phase increment by seven base periods in relation to the phase constraint of the second type of instructions;

The next three bits eee code the periods of the third type of instructions CO3.

Here are the meanings of the codes used:

001: processing with the reference period,

010: processing with a period which is twice the reference period,

011: processing with a period which is three times the reference period,

100: processing with a period which is four times the reference period.

101: processing with a period which is five times the reference period,

110: processing with a period which is six times the reference period,

111: processing with a period which is seven times the reference period,

000: processing with a period which is eight times the reference period.

The next three bits fff code the phase constraint to the fourth type of instructions CO4.

Here are the meanings of the codes used:

000: unused type of instructions,

001: phase increment by one base period in relation to the phase constraint of the third type of instructions, 010: phase increment by two base periods in relation to the phase constraint of the third type of instructions, 011: phase increment by three base periods in relation to the phase constraint of the third type of instructions, 100: phase increment by four base periods in relation to the phase constraint of the third type of instructions, 101: phase increment by five base periods in relation to the phase constraint of the third type of instructions, 110: phase increment by six base periods in relation to the phase constraint of the third type of instructions, 111: phase increment by seven base periods in relation to the phase constraint of the third type of instructions.

The next three bits ggg code the period of the fourth type of instructions CO4.

Here are the meanings of the codes used:

001: processing with the reference period,

010: processing with a period which is twice the reference period,

011: processing with a period which is three times the reference period,

100: processing with a period which is four times the reference period,

101: processing with a period which is five times the reference period,

110: processing with a period which is six times the reference period,

111: processing with a period which is seven times the reference period,

000: processing with a period which is eight times the reference period.

Figure 3:
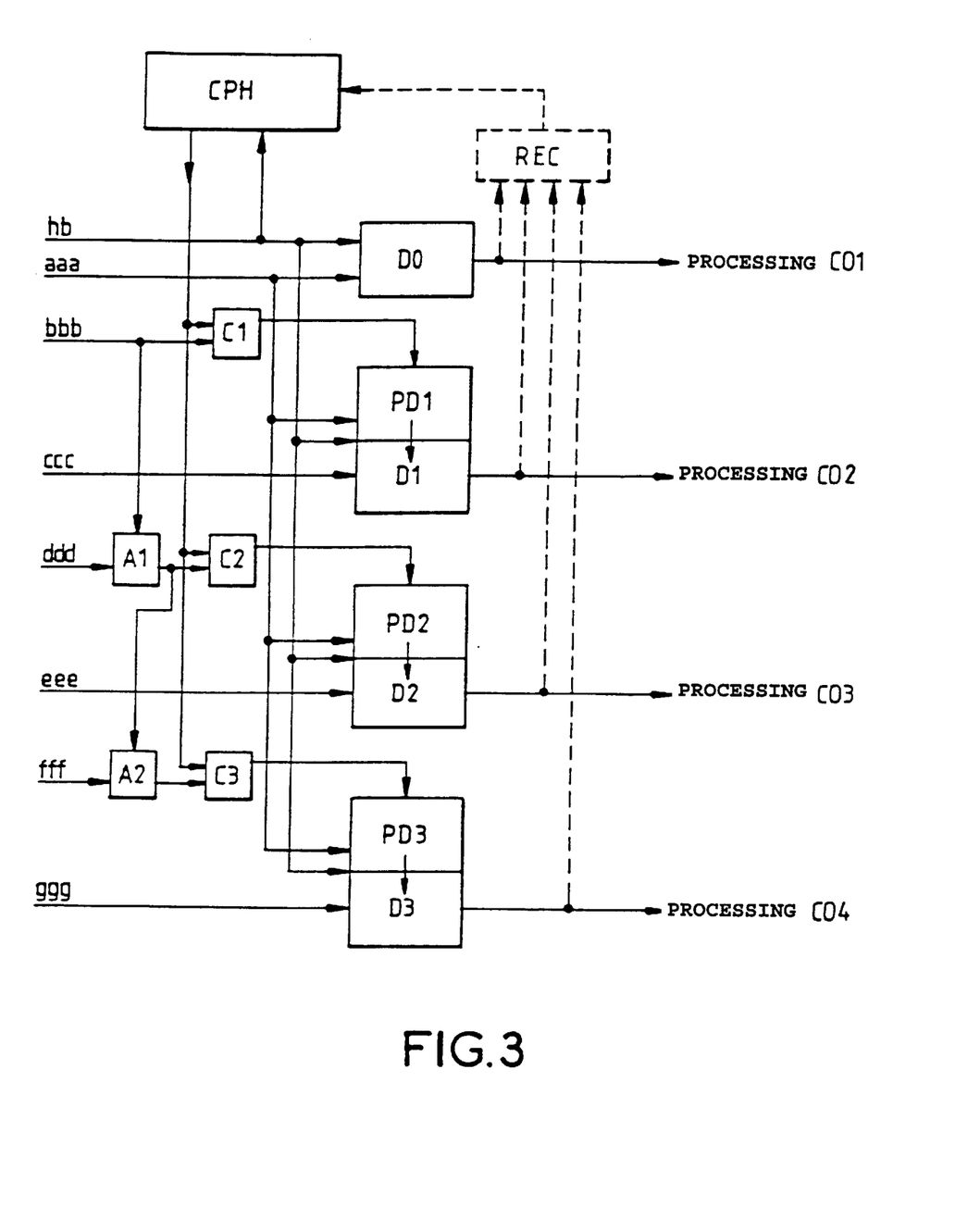
FIG. 3 represents a sequencer device capable of processing various types of instructions with matched frequencies.

FIG. 3 shows a diagram of an example of a sequencer device SEQ which can perform the sequencing which has just been described.

The sequencer device SEQ has a device CPH delivering a so-called current phase, a first divider D0 associated with a first type of instructions which is processed and a predivider/divider assembly (PD1, D1), (PD2, D2), (PD3, D3) associated with each of the other types of instructions to be processed.

The device CPH delivering the current phase receives pulses from a base clock hb functioning at the base frequency. In the example described, this device is a saturation counter CPH, that is to say that after zeroing it generates a counting sequence until each one of the predivider/divider assemblies has started with the correct phase constraint.

At the end of this counting sequence, it remains locked in its final state and can only be reinitialized by a suitable command which may be a general reengagement of the input/output controller CO or which may come from an optional resetting device REC which detects abnormal events, for example the processing of more than one type of instructions at a given time, or the times corresponding to the multiples common to all the periods of the various types of instructions, which allows more frequent re-initialization.

The first divider D0 is a divider for dividing the base clock hb, and it receives the value aaa of the reference period and delivers pulses having the reference period and the reference phase. These pulses correspond to the processing start times for the instructions of the first type and have a duration equal to the duration of the base clock period.

Each predivider/divider assembly (PD1, D1), (PD2, D2), (PD3, D3) also receives the base clock hb. Each predivider PD1, PD2, PD3 receives the value of the reference period aaa and a start signal from the comparison between the phase constraint of the associated type of instructions and the current phase.

Each predivider PD1, PD2, PD3 generates, in the direction of the associated divider, a signal which has a period equal to the reference period and which is phased according to the phase constraint of the associated type of instructions.

Each divider D1, D2, D3 furthermore receives the value of the period of the associated type of instructions. Each divider D1, D2, D3 therefore generates periodic pulses of duration equal to one base period, having the period and the phase constraint of the associated type of instructions. These pulses correspond to the processing start times for the associated type of instructions.

Each predivider PD1 to PD3 is associated with a comparator C1 to C3 which delivers the start signal to it. Each comparator C1, C2, C3 receives the current phase and compares it with the phase constraint, in relation to the reference phase, of the associated type of instructions. The first comparator C1 directly receives the value of the phase increment bbb in relation to the reference phase, this value corresponding to the phase constraint of the second type of instructions CO2 which is processed.

For the other types of instructions CO3, CO4 of rank higher than two, each comparator C2, C3 interacts with an adder A1, A2. Each adder A1, A2 delivers to the comparator C2, C3 the phase constraint, in relation to the reference phase, of the associated type of instructions. Each adder A1, A2 receives the phase constraint of the type of instructions which was processed with the previous rank and the value of the phase increment ddd, fff in relation to the said phase constraint.

The input/output controller CO also has management means Mg for the memory PROM, with a buffer unit BT driven by the sequencer device SEQ and drive means SP for the pseudo-instructions. In the example described, this buffer unit BT accumulates four consecutive bytes which are stored in the memory PROM so as to form an entity of the instruction type usable in particular by the code analysis device DAC.

The central processor unit UC may drive the downloading to the memory PROM. The management means MG for the memory PROM have a sequencer device SEQP for the memory which receives, via the input serial line Ise, instructions to erase all or some of the memory PROM and/or instructions to load starting from a base address lying in the parameter of the instruction. This base address is sent to the access pointer POIN. In the case of an instruction to erase, the sequencer device SEQP produces the sequence specific to erasing fully or unit by unit starting from the base address.

After an instruction to load, the sequencer device SEQP receives, via the serial line, one or more 32 bit words which it writes starting from the base address while adhering to the programming sequence. In the event of a problem detected during the writing, provision is made to update a device ST for storing the anomalies encountered.

The code analysis device DAC has an instruction decoding device DEC which implements as priority the bits of rank 0 to 9 in the instructions. The bits of rank 0 to 7 are analysed to generate the commands suitable for executing the action contained by the instruction. Bits 8 and 9 of the instruction are verified in different ways according to where they come from since they do not express the same thing, as was described above. These commands are sent to the interface device DI in question, which also receives the values of the parameters.

Security units SEC are also provided in the code analysis device DAC. These units verify that the coherence criteria are satisfied, such as the odd parity of the instructions or of the pseudo-instructions, and that it is secure to run the instructions and pseudo-instructions originating from the memory PROM.

The pseudo-instructions from the memory PROM pass, after having been decoded, into a buffer unit BTA having as many buffers as there are types of pseudo-instructions.

The content of the device ST for storing the anomalies encountered by the code analysis device DAC and by the sequencer device SEQP during their operation may be sent to the central processor unit UC on its request or by executing an instruction from the memory PROM. This transmission is carried out only via one of the transmission lines, and in the example described it is assumed that this is the output serial line Iss2. The storage device ST may be zeroed during reinitialization of the input/output controller or by a dedicated instruction.

What is claimed is:

1. Input/output controller intended to interact with a central processor unit of a computer which communicates with peripheral electronic equipment and connected on the one hand to the central processor unit and on the other hand to the peripheral electronic equipment, in which a link with the central processor unit is produced with an input serial line and at least one output serial line, and in that input/output controller receives instructions of a first type from the central processor unit and instructions of at least one second type which are stored in a memory external to the central processor unit, wherein said input/output controller processes using a sequencer device which allocates time slots to the instructions according to their type, the type indicating at least a source of the instructions.

2. Input/output controller according to claim 1, characterized in that certain instructions of one or more types from the memory are pseudo-instructions formed by lists of analogue values which are stored in the memory, the various types corresponding to lists of values of different natures.

3. Input/output controller according to claim 1, characterized in that certain instructions from the memory form sequences which are executed after reception of a synchronization instruction.

4. Input/output controller according to claim 1, characterized in that the sequencer device allocates equal time slots for the successive processing of each of the types of instructions, then allows itself an optionally zero time interval without processing before recommencing the processing.

5. Input/output controller according to claim 1, characterized in that the sequencer device allocates equal time slots to the processing of the instructions according to their type, each type of instructions being assigned an occurrence period, the first type of instructions which is processed having the shortest period, this period being referred to as the reference period, and a phase referred to as the reference phase, the other types of instructions having a phase constraint in relation to the reference phase, these other types of instructions being processed with a rank which is a function of the increasing order of their phase constraint, their period being a multiple of the period of the reference.

6. Input/output controller according to claim 5, characterized in that the reference phase is chosen by convention to be zero.

7. Input/output controller according to claim 5, characterized in that the reference period is a multiple of a duration, referred to as the base period, which corresponds to the access time for an instruction in the memory.

8. Input/output controller according to claim 5, characterized in that the phase constraint of the second type of instructions which is processed is expressed by a phase increment in relation to the reference phase.

9. Input/output controller according to claim 5, characterized in that the phase constraint of the types of instructions of rank higher than two is expressed by a phase increment in relation to the phase constraint of the type of instructions which is processed in the preceding rank.

10. Input/output controller according to claim 5, characterized in that the sequencer device has:

a device delivering a phase referred to as the current phase from a base clock whose period corresponds to the access time for an instruction in the memory, a first divider of the base clock which receives, in addition to the base clock, the value of the reference period and which generates pulses having the reference period and the reference phase;

one predivider and divider assembly associated respectively with each of the other types of instructions to be processed, and receiving the base clock and the reference period, each predivider receiving the value of the reference period and a start signal originating from the comparison between the phase constraint of the associated type of instructions and the current phase, and generating, in the direction of the divider of the same assembly as itself, a signal which has a period equal to the reference period and is phased according to the phase constraint of the associated type of instructions, each divider generating pulses having the period and the phase constraint of the associated type of instructions.

11. Input/output controller according to claim 10, characterized in that the device delivering the current phase is a saturation counter receiving the base clock.

12. Input/output controller according to claim 11, characterized in that the saturation counter is zeroed when the input/output controller is reengaged or by a signal delivered by a reset device.

13. Input/output controller according to claim 10, characterized in that each predivider is associated with a comparator which delivers the start signal to it, each comparator receiving the current phase and the phase constraint, in relation to the reference phase, of the associated type of instructions.

14. Input/output controller according to claim 13, characterized in that the first comparator directly receives the value of the phase increment of the second type of instructions in relation to the reference phase.

15. Input/output controller according to claim 13, characterized in that the other comparators are each associated with an adder, each adder delivering the phase constraint, in relation to the reference phase, of the associated type of instructions, and receiving the phase constraint of the type of instructions which is processed with the preceding rank and the value of the phase increment in relation to the said constraint.

16. Input/output controller according to claim 1, characterized in that an instruction other than a pseudo-instruction has thirty-two bits, including a code on at most eight bits and a parameter on at most twenty-one bits.

17. Input/output controller according to claim 16, characterized in that the values of the occurrence periods and of the phase constraints of the various types of instructions are coded in the parameter of one or more loading instructions.

18. Input/output controller according to claim 1, characterized in that it has a code analysis device which decodes the codes of the instructions.

19. Input/output controller according to claim 2, characterized in that a pseudo-instruction is executed under the control of an activation instruction.

20. Input/output controller according to claim 2, characterized in that a pseudo-instruction has, on thirty-two bits, a list of analogue values which are coded in the form of increments.

21. Input/output controller according to claim 2, characterized in that a pseudo-instruction has, on thirty-two bits, a list of analogue values which are coded in the form of absolute values.

22. Input/output controller according to claim 2, characterized in that it has drive means for the pseudo-instructions which receive the activation instructions, which keep the codes of the activation instructions and deal with access to the memory via an access pointer.

23. Input/output controller according to claim 22, characterized in that the code analysis device receives the pseudo-instructions and the codes of the activation instructions from the drive means for the pseudo-instructions.

24. Input/output controller according to claim 1, characterized in that it has management means for the memory with a buffer unit (BT) driven by the sequencer device (SEQ).

25. Input/output controller according to claim 24, characterized in that the buffer unit is driven by the drive means for the pseudo-instructions.

26. Input/output controller according to claim 24, characterized in that the management means for the memory have a sequencer device for downloading to the memory.

27. Input/output controller according to claim 18, characterized in that the code analysis device has an instruction decoding device and at least one security unit.

28. Input/output controller according to claim 18, characterized in that it has a device for storing anomalies encountered by the code analysis device.

29. Input/output controller according to claim 1, characterized in that it has at least one interface device for interfacing with the peripheral electronic equipment, connected to the peripheral electronic equipment by at least one two-way interface channel which can be configured in particular as a parallel bus, as a link carrying Boolean operations, as a serial link and as a link with an optical coder.

30. Input/output controller according to claim 1, characterized in that it has an interface device for interfacing with the central processor unit, connected to the central processor unit by the input and output lines.

* * * * *